United States Patent
Van Asseldonk et al.

(10) Patent No.: US 8,101,693 B2
(45) Date of Patent: Jan. 24, 2012

(54) MULTI REACTOR PROCESS

(75) Inventors: Lauwrence Martin Jozef Van Asseldonk, Sarnia (CA); Stephen John Brown, Calgary (CA)

(73) Assignee: NOVA Chemicals (International) S.A. (CH)

( * ) Notice: Subject to any disclaimer, the term of this patent is extended or adjusted under 35 U.S.C. 154(b) by 0 days.

(21) Appl. No.: 12/928,197

(22) Filed: Dec. 6, 2010

(65) Prior Publication Data

US 2011/0144289 A1 Jun. 16, 2011

(30) Foreign Application Priority Data

Dec. 11, 2009 (CA) ....................................... 2688217

(51) Int. Cl.
*C08F 2/04* (2006.01)
*C08F 10/02* (2006.01)

(52) U.S. Cl. ................. 526/64; 526/65; 526/87

(58) Field of Classification Search .................... 526/64, 526/65, 87

See application file for complete search history.

(56) References Cited

U.S. PATENT DOCUMENTS

| | | |
|---|---|---|
| 5,057,475 A | 10/1991 | Canich et al. |
| 5,064,802 A | 11/1991 | Stevens et al. |
| 5,132,380 A | 7/1992 | Stevens et al. |
| 5,198,401 A | 3/1993 | Turner et al. |
| 5,492,876 A | 2/1996 | Gillis et al. |
| 5,519,098 A | 5/1996 | Brown et al. |
| 5,527,752 A | 6/1996 | Reichle et al. |
| 5,589,555 A | 12/1996 | Zboril et al. |
| 5,637,660 A | 6/1997 | Nagy et al. |
| 5,851,945 A | 12/1998 | Turner et al. |
| 5,852,145 A | 12/1998 | McLain et al. |
| 6,024,483 A | 2/2000 | Burke et al. |
| 6,372,864 B1 * | 4/2002 | Brown ............................ 526/65 |
| 6,586,541 B2 * | 7/2003 | Citron ........................ 526/113 |
| 6,720,396 B2 | 4/2004 | Bell et al. |
| 2006/0149004 A1 * | 7/2006 | Lee et al. ........................ 526/65 |

* cited by examiner

*Primary Examiner* — Fred M Teskin

(74) *Attorney, Agent, or Firm* — Kenneth H. Johnson

(57) ABSTRACT

This invention relates to the polymerization of ethylene polymers using a continuously stirred tank reactor (CSTR) that is connected in series to a tubular reactor. The tubular reactor receives a polymer solution from the CSTR. Further polymerization in the tubular reactor improves production efficiencies, particularly with respect to lowering the amount of energy required to recover the polymer and residual comonomer from the solution. The use of tempered i.e. (heated) ethylene in the tubular reactor has been discovered to mitigate gel problems and lower/reduce levels of hexane extractables.

11 Claims, No Drawings

MULTI REACTOR PROCESS

FIELD OF THE INVENTION

This invention relates to the polymerization of ethylene in a solution polymerization process which utilizes at least two different types of polymerization reactors, namely at least one stirred reactor and at least one tubular reactor.

BACKGROUND OF THE INVENTION

The preparation of ethylene copolymers in a solution polymerization process is well known. The use of a continuously stirred tank reactor (CSTR) in such solution processes is generally preferred because the CSTR provides good mixing of the solvent, monomer(s) and catalyst.

The polymerization of ethylene is highly exothermic. Accordingly, it is common practice to use ambient or chilled reactor feeds to maximize reactor productivity for a given reaction temperature.

The use of a CSTR with chilled feeds works especially well for ethylene homopolymerizations. However, CSTR's are not without limitations, especially for the preparation of thermoplastic ethylene copolymers having a density of from about 0.900 to 0.930 g/cc. One difficulty with the preparation of ethylene copolymers is that the reactivity of the ethylene is generally higher than that of the other alpha olefins (such as butene, hexene and octene) that are commonly used to prepare the copolymers. Thus, the ethylene is preferentially consumed; leaving a reactor effluent that is comonomer rich and typically still contains some active catalyst. This problem can be mitigated by adding another CSTR to receive the discharge from the first CSTR—and indeed, the use of two CSTR's is well known. Moreover, the use of two CSTR's also provides flexibility to adjust the molecular weight and/or comonomer distribution of the resulting polyethylene. However, even the discharge from the second CSTR used to prepare copolymers is generally also comonomer rich and often still contains active catalyst. The recovery of the residual comonomer from the polymer/solvent solution is understandably energy intensive. Accordingly, a cost effective method to recover the remaining comonomer and also, lower residual catalyst in the finished product would provide a useful addition to the art.

SUMMARY OF THE INVENTION

The present invention is generally useful for preparing ethylene homopolymers or copolymers. Thus, in one embodiment, the present invention provides a process for the preparation of polyethylene having a density of from 0.890 to 0.970 g/cc comprising the polymerization of ethylene and a comonomer in at least two polymerization reactors, wherein said process comprises:
  a) providing a first ethylene feed containing ethylene and, optionally, at least one $C_4$ to $C_{10}$ alpha-olefin comonomer to at least one continuously stirred tank reactor (CSTR) in the presence of a catalyst system under solution polymerization conditions, thereby producing a first polyethylene solution containing a first polyethylene component;
  b) discharging said first polyethylene solution to a tubular reactor at a first discharge temperature;
  c) directing additional, tempered, ethylene to said tubular reactor under polymerization conditions whereby additional polymerization occurs in the presence of said first polyethylene solution; and
  d) discharging from said tubular reactor a final polyethylene solution containing said first polyethylene solution and said additional polyethylene at a final discharge temperature,
with the proviso that said additional tempered ethylene is added at a temperature of between 100° C. and said final discharge temperature.

In general, the reaction configuration described herein is suitable for the preparation of ethylene-copolymer plastomers (i.e. copolymers having a very low density, such as ethylene-octene copolymers having a density of from 0.850 to 0.900); thermoplastic ethylene copolymers (i.e. copolymers having a density of from about 0.900 to 0.955 g/cc) and even ethylene homopolymers.

The present invention is especially suitable for the preparation of thermoplastic ethylene copolymers having a density of from about 0.900 to 0.930 g/cc. The comonomer used to prepare these copolymers has a lower reactivity ratio than ethylene—i.e. the ethylene is preferentially consumed in the CSTR, leaving a polymer solution with residual monomer that is comonomer rich.

Thus, in a preferred embodiment, the present invention provides a process for the preparation of polyethylene having a density of from 0.900 to 0.930 g/cc comprising the polymerization of ethylene in at least two polymerization reactors, wherein said process comprises:
  a) providing a first ethylene feed containing ethylene and at least one alpha-olefin comonomer to at least one continuously stirred tank reactor (CSTR) in the presence of a catalyst system under solution polymerization conditions, thereby producing a first solution containing a first polyethylene component and residual comonomer;
  b) discharging said solution containing said first polyethylene component to a tubular reactor at a first discharge temperature;
  c) directing additional, tempered, ethylene to said tubular reactor under polymerization conditions whereby additional polymerization occurs in the presence of said first polyethylene component; and
  d) discharging from said tubular reactor a final polyethylene solution containing said first polyethylene component and said additional polyethylene at a final discharge temperature,
with the proviso that said tempered ethylene is added at a temperature of between 100° C. and said final discharge temperature.

The addition of "cold" ethylene monomer to an unstirred tubular reactor can cause very high gel levels in the resulting copolymer. We have discovered that the formation of gels may be mitigated through the use of tempered ethylene. In addition, we have observed low gel levels when the rate of polymerization is comparatively low in the tubular reactor.

In a highly preferred embodiment, this lower rate of polymerization may be obtained by not adding any additional catalyst to the tubular reactor—i.e. the residual catalyst from the CSTR(s) catalyzes the reaction in the tubular reactor. Thus, in a highly preferred embodiment, the present invention provides a process for the preparation of polyethylene having a density of from 0.900 to 0.930 g/cc comprising the polymerization of ethylene in at least two polymerization reactors, wherein said process comprises:
  a) providing a first ethylene feed containing ethylene and at least one alpha-olefin comonomer to at least one continuously stirred tank reactor (CSTR) in the presence of a catalyst system under solution polymerization conditions, thereby producing a first solution containing a first polyethylene component and residual comonomer;

b) discharging said solution containing said first polyethylene component to a tubular reactor at a first discharge temperature;

c) directing additional, tempered, ethylene to said tubular reactor under polymerization conditions whereby additional polymerization occurs in the presence of said first polyethylene component; and d) discharging from said tubular reactor a final polyethylene solution containing said first polyethylene component and said additional polyethylene at a final discharge temperature, with the provisos that a) said additional tempered ethylene is added at a temperature of between 100° C. and said final discharge temperature and b) no catalyst is added to said tubular reactor.

DETAILED DESCRIPTION OF PREFERRED EMBODIMENTS

A. Suitable Catalysts

Any catalyst system that is capable of providing ethylene polymers under solution conditions may be employed.

As used herein, the phrase "catalyst system" includes at least one "transition metal catalyst" (also referred to herein as a "catalyst compound") and may also include a cocatalyst or activator.

As used herein, the phrase "catalyst compound" includes any compound that, once appropriately activated, is capable of catalyzing the polymerization or oligomerization of olefins. The catalyst compound comprises at least one Group 3 to Group 15 metal atom (preferably a Group 4 to 12 transition metal, most preferably a Group 4 metal such as titanium, zirconium or hafnium) or lanthanide or actinide atom.

"Ziegler Natta" polymerization catalysts may also be employed. These catalysts typically comprise a group 4 or group 5 metal—especially titanium or vanadium—in combination with hydrocarbyl aluminum activator of the general formula:

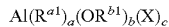

$$Al(R^{a1})_a(OR^{b1})_b(X)_c$$

where $R^{a1}$ is a hydrocarbyl group having from 1 to 10 carbon atoms; $OR^{b1}$ is an alkoxy or aryloxy group where $OR^{b1}$ is a hydrocarbyl fragment having from 1 to 10 carbon atoms and being bonded to oxygen; X is chloride or bromide and a+b+c=3, with the proviso that a is greater than 0. Examples of the hydrocarbyl aluminum activator in widespread use include trimethyl aluminum, trimethyl aluminum and tributyl aluminum.

Preferred Ziegler Natta catalysts contain at least one of titanium or vanadium. Exemplary titanium compounds include titanium halides (especially titanium chlorides, of which $TiCl_4$ is preferred); titanium alkyls; titanium alkoxides (which may be prepared by reacting a titanium alkyl with an alcohol) and "mixed ligand" compounds (i.e. compounds which contain more than one of the above described halide, alkyl and alkoxide ligands). Exemplary vanadium compounds may also contain halide, alkyl or alkoxide ligands. In addition vanadium oxy trichloride ("$VOCl_3$") is known as a Ziegler Natta catalyst component and is suitable for use in the present invention.

As will be appreciated by those skilled in the art of ethylene polymerization, conventional Ziegler Natta catalysts may also incorporate additional components such as an electron donor (for example an amine or an ether) and/or a magnesium compound (for example a magnesium chloride and/or magnesium alkyl such as a butyl ethyl magnesium). A halide source (which is typically a chloride such as tertiary butyl chloride) is typically used when a magnesium alkyl compound is employed.

Such components, if employed, may be added to the other catalyst components prior to introduction to the reactor or may be directly added to the reactor.

It is highly preferred that the Ziegler Natta catalyst contains a titanium compound, a magnesium alkyl compound and a chloride compound and that an aluminum alkoxide is used as the cocatalyst.

Examples of Ziegler Natta catalysts and methods of preparing them are described in U.S. Pat. Nos. 5,492,876; 5,519,098; and 5,589,555.

However, it is preferred to use a well characterized organometallic compound as the catalyst compound in the process of this invention instead of (or in addition to) a Ziegler Natta catalyst. These catalyst compounds typically comprise a metal atom, at least one "functional" ligand and at least one leaving group. Further details follow.

As used herein, the phrase "leaving group" generally refers to one or more chemical moieties bound to the metal center of the catalyst compound that can be abstracted from the catalyst compound, thus producing a species active towards olefin polymerization or oligomerization.

As used herein, in reference to Periodic Table "Groups" of Elements, the "new" numbering scheme for the Periodic Table Groups are used as in the CRC HANDBOOK OF CHEMISTRY AND PHYSICS (David R. Lide ed., CRC Press 81$^{st}$ ed. 2000).

As used herein, a "hydrocarbyl" includes aliphatic, cyclic, olefinic, acetylenic and aromatic radicals (i.e. hydrocarbon radicals) comprising hydrogen and carbon that are deficient by one hydrogen. A "hydrocarbylene" is deficient by two hydrogens.

As used herein, an "alkyl" includes linear, branched and cyclic paraffin radicals that are deficient by one hydrogen. Thus, for example, a —$CH_3$ group ("methyl") and a $CH_3CH_2$— group ("ethyl") are examples of alkyls.

As used herein, an "alkenyl" includes linear, branched and cyclic olefin radicals that are deficient by one hydrogen; alkynyl radicals include linear, branched and cyclic acetylene radicals deficient by one hydrogen radical.

As used herein, "aryl" groups includes phenyl, naphthyl, pyridyl and other radicals whose molecules have the ring structure characteristic of benzene, naphthylene, phenanthrene, anthracene, etc. For example, a $C_6H_5^-$ aromatic structure is an "phenyl", a $C_6H_4^{2-}$ aromatic structure is an "phenylene". An "arylalkyl" group is an alkyl group having an aryl group pendant there from, examples of which include benzyl, phenethyl, tolylmethyl and the like; an "alkylaryl" is an aryl group having one or more alkyl groups pendant there from, examples of which include tolyl, xylyl, mesityl, cumyl and the like.

As used herein, an "alkylene" includes linear, branched and cyclic hydrocarbon radicals deficient by two hydrogens. Thus, —$CH_2$— ("methylene") and —$CH_2CH_2$— ("ethylene") are examples of alkylene groups. Other groups deficient by two hydrogen radicals include "arylene" and "alkenylene".

As used herein, the phrase "heteroatom" includes any atom other than carbon and hydrogen that can be bound to carbon. A "heteroatom-containing group" is a hydrocarbon radical that contains a heteroatom and may contain one or more of the same or different heteroatoms. In one embodiment, a heteroatom-containing group is a hydrocarbyl group containing from 1 to 3 atoms selected from the group consisting of boron, aluminum, silicon, germanium, nitrogen, phosphorous, oxygen and sulfur. Non-limiting examples of heteroatom-containing groups include radicals of imines, amines, oxides, phosphines, ethers, ketones, oxoazolines heterocyclics, oxazolines, thioethers, and the like.

As used herein, "heterocyclic" refers to ring systems having a carbon backbone that comprise from 1 to 3 atoms selected from the group consisting of boron, aluminum, silicon, germanium, nitrogen, phosphorous, oxygen and sulfur, unless the heteroatom (non-carbon atom) is described.

As used herein, an "alkylcarboxylate", "arylcarboxylate", and "alkylarylcarboxylate" is an alkyl, aryl, and alkylaryl, respectively, that possesses a carboxyl group in any position. Examples include $C_6H_5CH_2C(O)O^-$, $CH_3C(O)O^-$, etc.

As used herein, "non-interfering" means that the ligand (or cation) being referred to does not interfere with olefin polymerization (i.e. that it does not reduce the activity of olefin polymerization by more than 50% in comparison to a polymerization conducted in the absence of the ligand or cation).

As used herein, the term "substituted" means that the group following that term possesses at least one moiety in place of one or more hydrogens in any position, the moieties selected from such groups as halogen radicals (esp., Cl, F, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals, and combinations thereof.

As used herein, structural formulas are employed as is commonly understood in the chemical arts; lines ("—") used to represent associations between a metal atom ("M", Group 3 to Group 15 atoms) and a ligand or ligand atom (e.g. cyclopentadienyl, nitrogen, oxygen, halogen ions, alkyl, etc.), as well as the phrases "associated with", "bonded to" and "bonding", are not limited to representing a certain type of chemical bond, as these lines and phrases are meant to represent a "chemical bond"; a "chemical bond" defined as an attractive force between atoms that is strong enough to permit the combined aggregate to function as a unit, or "compound".

Unless stated otherwise, no embodiment of the present invention is herein limited to the oxidation state of the metal atom "M" as defined below in the individual descriptions and examples that follow. The ligation of the metal atom "M" is such that the compounds described herein are neutral, unless otherwise indicated.

B. Transition Metal Catalyst (or Catalyst Compound)

In general, any transition metal catalyst compound which is activated by an aluminum alkyl or methyl aluminoxane (MAO), or an "ionic activator" (discussed in Part C, below) is potentially suitable for use in the present invention. An extensive discussion of such catalysts is provided in U.S. Pat. No. 6,720,396 (Bell et al.; assigned to Univation Technologies) and the references cited therein (disclosure to all of which is incorporated herein by reference). A general (non-limiting) overview of such catalyst compounds follows. Such catalysts typically contain a "bulky" functional ligand. Preferred catalyst compounds are group 4 metal complexes (especially titanium or zirconium) which contain one cyclopentadienyl ligand ("homocyclopentadienyl complexes") or two cyclopentadienyl ligands ("biscyclopentadienyl complexes").

The bulky ligands are generally represented by one or more open, acyclic, or fused ring(s) or ring system(s) or a combination thereof. The ring(s) or ring system(s) of these bulky ligands are typically composed of atoms selected from Groups 13 to 16 atoms of the Periodic Table of Elements. Preferably the atoms are selected from the group consisting of carbon, nitrogen, oxygen, silicon, sulfur, phosphorous, germanium, boron and aluminum or a combination thereof. Most preferably the ring(s) or ring system(s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

In one embodiment, catalyst compounds are represented by the formula:

$$L^A L^B MQ_n \qquad (I)$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is zirconium, hafnium or titanium. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine, pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of .eta.-bonding to M, preferably .eta.$^3$-bonding to M and most preferably .eta.$^5$-bonding. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a heterocyclopentadienyl ancillary ligand. Other $L^A$ and $L^B$ bulky ligands include but are not limited to bulky amides, phosphides, alkoxides, aryloxides, phosphinimides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of formula (I) only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris (trifluoromethyl)-silyl, methyl-bis(difluoromethyl)silyl, bromomethyldimethylgermyl and the like; and disubstituted boron radicals including dimethylboron for example; and disubstituted heteroatom radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. As used herein the term "leaving group" is any ligand that can be abstracted from a bulky ligand catalyst compound to form a bulky ligand catalyst species capable of polymerizing one or more olefin(s). In one embodiment, Q is a monoanionic labile ligand having a sigma-bond to M. Depending on the oxidation state of the metal, the value for n is 0, 1 or 2 such that formula (I) above represents a neutral bulky ligand catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methyoxy, ethyoxy, propoxy, phenoxy, bis(N-methylanilide), dimethylamide, dimethylphosphide radicals and the like.

In another embodiment, the catalyst compound is represented by the following formula:

These compounds represented by formula (II) are known as bridged, ligand catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens and iron. Non-limiting examples of bridging group A may be represented by R'$_2$C, R'$_2$Si, R'$_2$Si R'$_2$Si, R'$_2$Ge, R'P, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, substituted chalcogen, or halogen or two or more R' may be joined to form a ring or ring system. In one embodiment, the bridged, ligand catalyst compounds of formula (II) have two or more bridging groups A.

In one embodiment, the catalyst compounds are those where the R substituents on the bulky ligands $L^A$ and $L^B$ of formulas (I) and (II) are substituted with the same or different number of substituents on each of the bulky ligands. In another embodiment, the bulky ligands $L^A$ and $L^B$ of formulas (I) and (II) are different from each other.

In a most preferred embodiment, catalyst compounds useful in the invention include bridged heteroatom, mono-bulky ligand compounds. More specifically, these highly preferred catalysts are group 4 metal (especially titanium) complexes characterized by having a bridged, bidentate cyclopentadienyl-amine ligand, as disclosed in the aforementioned U.S. Pat. No. 5,047,475. Preferred bridging groups are dialkyl silyls—especially dimethyl silyl. The amine portion of the ligand preferably has an alkyl substituent on the nitrogen atom (especially tertiary butyl) with the remaining nitrogen bands bonding to the transition metal (preferably titanium) and the silicon atome of the preferred dimethyl silyl bridging group. The cyclopentadienyl ligand is pi-bonded to the transition metal and covalently bonded to the bridging group. The cyclopentadienyl group is preferably substituted, especially tetra methyl cyclopentadienyl.

Preferred catalyst compounds include dimethylsilyltetramnethyl cyclopentadienyl-tertiary butyl amido titanium di chloride (and the alkyl analogues—i.e. with the two chloride ligands being replaced by simple alkyls, especially methyl) and the catalyst compounds illustrated in the present examples. U.S. Pat. Nos. 5,057,475 and 5,064,802 (are also illustrated in the present Examples).

In another embodiment, the catalyst compound is represented by the formula:

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to M and J; J is a heteroatom ancillary ligand; and A is a bridging group; Q is a univalent anionic ligand; and n is the integer 0, 1 or 2. In formula (III) above, $L^C$, A and J may form a fused ring system. In an embodiment, $L^C$ of formula (III) is as defined above for $L^A$ in formula (I) and A, M and Q of formula (III) are as defined above in formula (I).

In formula (III) J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred.

In another embodiment, catalyst compound is a complex of a metal, preferably a transition metal, a bulky ligand, preferably a substituted or unsubstituted pi-bonded ligand, and one or more heteroallyl moieties, such as those described in U.S. Pat. No. 5,527,752.

In another embodiment, the catalyst compounds are represented by the formula:

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and $Q_2(YZ)$ forms a unicharged polydentate ligand; A or Q is a univalent anionic ligand also bonded to M; X is a univalent anionic group when n is 2 or X is a divalent anionic group when n is 1; n is 1 or 2.

In formula (IV), L and M are as defined above for formula (I). Q is as defined above for formula (I), preferably Q is selected from the group consisting of —O—, —NR—, —CR$_2$— and —S—. Y is either C or S. Z is selected from the group consisting of —OR, —NR$_2$, —CR$_3$, —SR, —SiR$_3$, —PR$_2$, —H, and substituted or unsubstituted aryl groups, with the proviso that when Q is —NR— then Z is selected from one of the group consisting of —OR, —NR$_2$, —SR, —SiR$_3$, —PR$_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

In another embodiment of the invention, the catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these bulky ligand catalyst compounds are described in U.S. Pat. No. 5,637,660.

In one embodiment, the catalyst compounds are represented by the formula:

$$((Z)XA_t(YJ))_q MQ_n \qquad (V)$$

where M is a metal selected from Group 3 to 13 or lanthanide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X, Y or J, preferably X and J; q is 1 or 2; n is an integer from 1 to 4 depending on the oxidation state of M. In one embodiment, where X is oxygen or sulfur then Z is optional. In another embodiment, where X is nitrogen or phosphorous then Z is present. In an embodiment, Z is preferably an aryl group, more preferably a substituted aryl group.

It is also within the scope of this invention, in one embodiment, that the catalyst compounds include complexes of $Ni^{2+}$ and $Pd^{2+}$ described in U.S. Pat. No. 5,852,145. These complexes can be either dialkyl ether adducts, or alkylated reaction products of the described dihalide complexes that can be activated to a cationic state by the activators or cocatalysts are described below.

Also included as catalyst compounds are those diimine based ligands of Group 8 to 10 metal compounds.

Other suitable catalyst compounds are those Group 5 and 6 metal imido complexes described in U.S. Pat. No. 5,851,945, which is incorporated herein by reference. In addition, bulky ligand catalyst compounds include bridged bis(arylamido) Group 4 compounds, bridged bis(amido) catalyst compounds and catalysts having bis(hydroxy aromatic nitrogen ligands).

It is also contemplated that in one embodiment, the catalyst compounds of the invention described above include their structural or optical or enantiomeric isomers (meso and racemic isomers) and mixtures thereof.

Other catalyst compounds useful in this invention are disclosed in the aforementioned U.S. Pat. No. 6,720,396 (and references therein), reference to all of which is incorporated herein.

Highly preferred catalyst compounds are group IV metal compounds which contain at least one cyclopentadienyl ligand.

C. Activation

The above described transition metal catalysts are utilized for olefin polymerization in the presence of a cocatalyst or activator.

Aluminoxanes, especially methyl aluminoxane, are well known cocatalyst for organometallic catalyst compounds. Methyl aluminoxane, and near variants thereof (which typically contain small levels of higher alkyl groups) are commercially available products. Although the exact structure of these aluminoxanes is still somewhat uncertain, it is generally agreed that they are oligomeric species that contain repeating units of the general formula:

where R is (predominantly) methyl.

It is also well known to employ so-called "ionic activators" (also referred to herein as activator compounds) with organometallic catalyst compounds, as described in U.S. Pat. No. 5,198,401 (Hlatky and Turner) and U.S. Pat. No. 5,132,380 (Stevens and Neithamer). In general, these activators comprise a cation and a substantially non-coordinating anion.

Whilst not wishing to be bound by any theory, it is thought by many of those skilled in the art that boron activators initially cause the abstraction of one or more of the activatable ligands in a manner which ionizes the catalyst into a cation, then provides a bulky, labile, non-coordinating anion which stabilizes the catalyst in a cationic form. The resulting bulky, non-coordinating anion permits olefin polymerization to proceed at the cationic catalyst center (presumably because the non-coordinating anion is sufficiently labile to be displaced by monomer which coordinates to the catalyst. It should be expressly noted that the boron activator/phosphinimine catalyst may also form a non-ionic coordination complex which is catalytically active for olefin polymerization. The boron activator is described as being four coordinate—i.e. there must be four ligands bonded to the boron atom. Preferred boron activators are described in (i)-(ii) below:

(i) compounds of the formula $[R^5]^+[B(R^7)_4]^-$ wherein B is a boron atom, $R^5$ is a aromatic hydrocarbyl (e.g. triphenyl methyl cation) and each $R^7$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula —Si—$(R^9)_3$; wherein each $R^9$ is independently selected from the group consisting of a hydrogen atom and a $C_{1-4}$ alkyl radical; and (ii) compounds of the formula $[(R^8)_ZH]^+[B(R^7)_4]^-$ wherein B is a boron atom, H is a hydrogen atom, Z is a nitrogen atom or phosphorus atom, t is 2 or 3 and $R^8$ is selected from the group consisting of $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^7$ is as defined above.

In the above compounds preferably $R^7$ is a pentafluorophenyl radical. In general, preferred boron activators may be described as salts of tetra(perfluorophenyl) boron. More specifically, the preferred activators are anilinium, carbonium, oxonium, phosphonium and sulfonium salts of tetra(perfluorophenyl)boron, with anilinium and trityl (or "triphenyl methylium") salts being especially preferred.

It should also be noted that three coordinate boron activators (i.e. compounds of the formula $B(R^7)_3$ where $R^7$ is as defined above) are not suitable for use in the process of this invention. This is surprising as such compounds are well known as activators for metallocene catalysts. However, for reasons which are not completely understood, the use of a trivalent boron activator is not suitable for preparing polymers having a broad molecular distribution in accordance with the process of this invention.

Exemplary ionic activators include:
triethylammonium tetra(phenyl)boron,
tripropylammonium tetra(phenyl)boron,
tri(n-butyl)ammonium tetra(phenyl)boron,
trimethylammonium tetra(p-tolyl)boron,
trimethylammonium tetra(o-tolyl)boron,
tributylammonium tetra(pentafluorophenyl)boron,
tripropylammonium tetra(o,p-dimethylphenyl)boron,
tributylammonium tetra(m,m-dimethylphenyl)boron,
tributylammonium tetra(p-trifluoromethylphenyl)boron,
tributylammonium tetra(pentafluorophenyl)boron,
tri(n-butyl)ammonium tetra(o-tolyl)boron,
N,N-dimethylanilinium tetra(phenyl)boron,
N,N-diethylanilinium tetra(phenyl)boron,
N,N-diethylanilinium tetra(phenyl)n-butylboron,
N,N-2,4,6-pentamethylanilinium tetra(phenyl)boron,
di-(isopropyl)ammonium tetra(pentafluorophenyl)boron,
dicyclohexylammonium tetra(phenyl)boron,
triphenylphosphonium tetra(phenyl)boron,
tri(methylphenyl)phosphonium tetra(phenyl)boron,
tri(dimethylphenyl)phosphonium tetra(phenyl)boron,
tropillium tetrakispentafluorophenyl borate,
triphenylmethylium tetrakispentafluorophenyl borate,
benzene(diazonium)tetrakispentafluorophenyl borate,
tropillium tetrakis(2,3,5,6-tetrafluorophenyl)borate,
triphenylmethylium tetrakis(2,3,5,6-tetrafluorophenyl)borate,
benzene(diazonium)tetrakis(3,4,5-trifluorophenyl)borate,
tropillium tetrakis(3,4,5-trifluorophenyl)borate,
benzene(diazonium)tetrakis(3,4,5-trifluorophenyl)borate,
tropillium tetrakis(1,2,2-trifluoroethenyl)borate,
triphenylmethylium tetrakis(1,2,2-trifluoroethenyl)borate,
benzene(diazonium)tetrakis(1,2,2-trifluoroethenyl)borate,
tropillium tetrakis(2,3,4,5-tetrafluorophenyl)borate,
triphenylmethylium tetrakis(2,3,4,5-tetrafluorophenyl)borate, and
benzene(diazonium)tetrakis(2,3,4,5-tetrafluorophenyl)borate.

Readily commercially available ionic activators which are suitable for the process of this invention are N,N-dimethylaniliniumtetrakispentafluorophenyl borate, and triphenylmethylium tetrakispentafluorophenyl borate (also known as "trityl borate").

It is preferred to use the boron activator in an equimolar amount with respect to the transition metal of the catalyst (i.e. boron/titanium ratio of 1/1, when the catalyst is an organotitanium complex) through mole ratios of from 0.3/1 to 10.0/1 may be used.

D. Description of Solution Polymerization

Solution processes for the copolymerization of ethylene and an alpha olefin having from 3 to 12 carbon atoms are well known in the art. These processes are conducted in the presence of an inert hydrocarbon solvent typically a $C_{5-12}$ hydrocarbon which may be unsubstituted or substituted by a $C_{1-4}$ alkyl group, such as pentane, methyl pentane, hexane, heptane, octane, cyclohexane, methylcyclohexane and hydrogenated naphtha. An example of a suitable solvent which is commercially available is "Isopar E" ($C_{8-12}$ aliphatic solvent, Exxon Chemical Co.).

In general, a solution polymerization process may use one, two (or more) polymerization reactors. However, the process of this invention must use at least one CSTR and one tubular reactor.

The polymerization temperature in at least one CSTR is from about 80° C. to about 280° C. (preferably from about 120° C. to 220° C.) and the tubular reactor is operated at a slightly higher temperature. Cold feed (i.e. chilled solvent and/or monomer) may be added to the CSTR(s). The polymerization enthalpy heats the reactor. The polymerization solution which exits in the reactor may be more than 100° C. hotter than the reactor feed temperature. Agitation efficiency in the CSTR may be determined by measuring the reactor temperature at several different points. The largest temperature difference (i.e. between the hottest and coldest temperature measurements) is described as the internal temperature gradient for the polymerization reactor. A very well mixed CSTR has a maximum internal temperature gradient of less than 10° C. A particularly preferred agitator system is described in copending and commonly assigned U.S. Pat. No. 6,024,483. Preferred pressures are from about 500 psi to 8,000 psi. The most preferred reaction process is a "medium pressure process", which means that the pressure in each reactor is preferably less than about 6,000 psi (about 41,000 kiloPascals or kPa), and most preferably from about 1,500 psi to 3,000 psi (about 10,000-21,000 kPa).

If more than one CSTR is employed, it is preferable to add catalyst to each of the CSTR(s) in order to maintain a high reactor rate. The catalyst used in each CSTR may be the same or different but it is generally preferable to use the same type of catalyst in each CSTR. It is preferred that at least 60 weight % of the ethylene fed to the CSTR(s) is polymerized to polyethylene in the CSTR(s), with at least 70% ethylene conversion being highly preferred.

If it is desired to use a mixed catalyst system in which one catalyst is a single site catalyst and one catalyst is a Zeigler Natta (Z/N) catalyst, then it is preferable to use the single site catalyst in the first CSTR and the Z/N catalyst in the second CSTR.

E. Tubular Reactor

The process of this invention requires a tubular reactor that is connected to the discharge of the at least on CSTR. (For clarity, if two CSTR's are used in series, then the tubular reactor receives the discharge from the second CSTR).

The term "tubular reactor" is meant to convey its conventional meaning—namely a simple tube. The tubular reactor of this invention will have a length/diameter (L/D) ratio of at least 10/1. The tubular reactor is not agitated. Preferably, the tubular reactor is operated adiabatically. Thus, as polymerization progresses, the remaining comonomer is increasingly consumed and the temperature of the solution increases (both of which improve the efficiency of separating the remaining comonomer from the polymer solution). It is especially preferred that the temperature increase along the length of the tubular reactor is greater than 3° C. (i.e. that the discharge temperature from the tubular reactor is at least 3° C. greater than the discharge temperature from the CSTR that feeds the tubular reactor).

The tubular reactor used in this invention has a feed port for additional ethylene and solvent. The feed is "tempered"—i.e. the temperature of the additional ethylene and/or solvent is heated to above ambient (preferably to about 100° C.) but the temperature is below the discharge temperature of the tubular reactor. In a preferred embodiment, the ethylene is tempered to between 100 and 200° C. It is most preferred to add the ethylene with solvent. The amount of solvent (expressed as a weight ratio, based on ethylene) is preferably from 20/1 to 0.1/1, especially from 10/1 to 1/1

Optionally, the tubular reactor may also have feed ports for additional catalyst, cocatalyst, comonomer and/or telomerization agent (such as hydrogen). However, in a highly preferred embodiment, no additional catalyst is added to the tubular reactor.

The total volume of the tubular reactor is preferably at least 10 volume % of the volume of the at least one CSTR, especially from 30% to 200% (for clarity, if the volume of the CSTR is 1000 litres, then the volume of the tubular reactor is at least 100 litres and is preferably from 300 to 2000 litres).

The total amount of ethylene added to the tubular reactor is preferably from 1 to 50 weight % of the total ethylene added to the CSTR(s). For example, if one CSTR is being operated with an ethylene flow rate of 1000 kg/hr, then the ethylene flow to the tubular reactor would be from 10 to 500 kg/hr. Similarly, if two CSTR(s) were being operated with an ethylene flow of 1000 kg/hr to the first and 500 kg/hr to the second, then the flow of ethylene to the tubular reactor would be from 15 to 750 kg/hr.

F. Addition of Monomers and Solvent

Suitable monomers for copolymerization with ethylene include $C_{3-12}$ alpha olefins which are unsubstituted or substituted by up to two $C_{1-6}$ alkyl radicals. Illustrative non-limiting examples of such alpha-olefins are one or more of propylene, 1-butene, 1-pentene, 1-hexene, 1-octene and 1-decene. Octene-1 is highly preferred.

The monomers are dissolved/dispersed in the solvent either prior to being fed to the first CSTR (or for gaseous monomers the monomer may be fed to the reactor so that it will dissolve in the reaction mixture). Prior to mixing, the solvent and monomers are generally purified to remove potential catalyst poisons such as water, oxygen or other polar impurities. The feedstock purification follows standard practices in the art, e.g. molecular sieves, alumina beds and oxygen removal catalysts are used for the purification of monomers. The solvent itself as well (e.g. methyl pentane, cyclohexane, hexane or toluene) is preferably treated in a similar manner.

Generally, the catalyst components may be premixed in the solvent for the reaction or fed as separate streams to each reactor. In a highly preferred embodiment, catalyst is only added to the CSTR(s)—i.e. not added to the tubular reactor. In addition, the discharge from the CSTR (or final CSTR if more than one is used in series) must be directed to a tubular reactor.

In some instances premixing may be desirable to provide a reaction time for the catalyst components prior to entering the first CSTR. Such an "in line mixing" technique is described in the patent literature (most notably U.S. Pat. No. 5,589,555, issued Dec. 31, 1996 to DuPont Canada Inc.).

The residence time in each reactor will depend on the design and the capacity of the reactor. Generally the reactors should be operated under conditions to achieve a thorough mixing of the reactants. As previously noted, the polymerization reactors are arranged in series (i.e. with the solution from the at least one CSTR being transferred to the tubular reactor).

EXAMPLES

Further details of the invention are illustrated in the following, non-limiting, examples.

The first part of the examples illustrates the copolymerization of ethylene and octene-1 to prepare the resins used in this invention.

Test procedures used in the examples are briefly described below:

1. Melt Index ("$I_2$", "$I_6$", "$I_{21}$") testing is completed according to ASTM D1238. [Note: $I_2$ measurements are made with a 2.16 kg weight and $I_{21}$ measurements are made with a 21.6 kg weight at 190° C.]. Test results are reported in units of grams/10 minutes (though these units are often omitted by convention). MFR is the ratio of $I_{21}/I_2$ and "MI" is the $I_2$ value.

2. Stress Exponent ("$S.E_x$") is calculated by $$\frac{\log(I_6/I_2)}{\log(3)}.$$

[Note: Stress Exponent may be regarded as a proxy for molecular weight distribution (i.e. an increase in Stress Exponent value suggests a broadening of molecular weight distribution)]

3. Density is determined using the displacement method according to ASTM D792.

4. Hexane extractables were measured according to the U.S. Food and Drug Administration test set out in the Code of Federal Regulations Title 21, Part 177.1520.

Example 1

This example illustrates the continuous flow, solution copolymerization of ethylene at a medium pressure using a single pilot scale reactor system and a Ziegler Natta catalyst. The first reactor was a continuously stirred tank reactor ("CSTR") with a volume of 24 liters. The second reactor for experiments 2-4 was a tubular reactor having a volume of 82% of the CSTR volume (19.7 liters). Monomers, solvent and catalyst were fed into the reactor as indicated in Table 1. The solvent used in these experiments was methyl pentane. A Ziegler Natta catalyst consisting of titanium tetrachloride ($TiCl_4$), butyl ethyl magnesium (BEM) and tertiary butyl chloride (TBC), with an aluminum activator consisting of triethyl aluminum (TEAL or $Et_3Al$) and diethyl aluminum ethoxide (DEAO or $Et_2AlOEt$) was used. The BEM and TEAL were provided "premixed" (20/1 Mg/Al mole ratio).

All catalyst components were mixed in the methyl pentane solvent. The mixing order was BEM/TEAL and TBC; followed by $TiCl_4$; followed by DEAO. The catalyst was pumped into the reactor together with the methyl pentane solvent. The catalyst flow rate had an aim point expressed as parts per million $TiCl_4$ by weight, as shown in the table and was adjusted to maintain total ethylene conversions above 80%.

A list of other abbreviations used in the Tables follows:
hr: hour
conc: concentration
wt %: weight percent
wt/wt: weight/weight Temp: temperature
C: degrees Celsius
rpm: revolutions per minute
mol: mole or moler
ppm: parts per million by weight Part 1 (Comparative)

A first comparative experiment was conducted using the above described Z/N catalyst system and only the first CSTR. There is a discharge tube at the exit from the CSTR. The effective volume of this tube is about 10% of the volume of the CSTR. Thus, Table 1 shows a "tubular reactor volume" of 10%—even though this volume is simply the volume of the discharge tube. The product produced in this reactor establishes a "baseline" for melt index, density and stress exponent.

A second comparative experiment was conducted using essentially the same catalyst and CSTR as the first comparative experiment. A tubular reactor having a volume of 19.7 liters (about 82% of the volume of the CSTR) was connected to the discharge of the CSTR. No additional ethylene or catalyst was added to the tubular reactor. Further polymerization took place in the tubular reactor, as evidenced by a temperature increase of 14.5° C., corresponding to an estimated additional 14.3 kg/hr of copolymer formation. (The estimation of 14.3 kg of polymer produced was made using the known enthalpy of reaction for this polymerization, combined with a heat and mass balance, using techniques that are well known to those skilled in the art). As will be appreciated by those skilled in the art, the polymer produced in this experiment contained a substantial amount of low molecular weight copolymer/low density copolymer (i.e. "waxy copolymer" containing a large amount of comonomer). This is illustrated by the change in hexane extractable level from 0.66 to 0.76 wt %.

Comparative experiment 3 was conducted using the same CSTR and tubular reactor of comparative experiment 2, but additional ethylene was added to the tubular reactor. The temperature of the ethylene added to the tubular reactor was similar to the temperature of the ethylene added to the CSTR (about 41° C.)

The onset of fouling in the tubular reactor was detected by the presence of a large pressure drop of 1.9 MPa across the tubular reactor. In addition, blown film prepared from resin made in this manner was observed to contain high levels of gels. The blown film was analyzed by an optical cornea and observed to contain 399 detectable gels per square meter of film. These two problems—namely the onset of reactor fouling and the contamination of the product with gels—clearly indicate that the process would have limited commercial viability.

B. Inventive

Ethylene copolymer was prepared in essentially the same manner as comparative experiment 3 (above) except that the ethylene was "tempered"—reheated to 126° C. The level of hexane extractables in the inventive polymer was 0.65 wt % (which compares favorably with the 0.66 wt % level of the baseline polymer produced in comparative experiment 1. In addition, the gel level in film prepared from the resin was reduced 85% in comparison to the gel level of comparative example 3.

TABLE 1

|  | Units | Comparative 1 Values | Comparative 2 Values | Comparative 3 Values | Inventive Values |
| --- | --- | --- | --- | --- | --- |
| CSTR conditions |  |  |  |  |  |
| Total flow to CSTR | kg/hr | 650.1 | 650.0 | 649.0 | 649.9 |
| Ethylene feed conc. to CSTR | wt % | 13.4 | 13.5 | 13.2 | 13.2 |
| 1-octene/ethylene ratio in CSTR feed | wt/wt | 0.51 | 0.59 | 0.50 | 0.53 |
| hydrogen conc in CSTR feed | ppm | 1.00 | 1.00 | 1.00 | 1.00 |
| Primary Feed Temp to CSTR | C. | 30.0 | 30.0 | 29.6 | 30.0 |
| CSTR Mean Temp | C. | 190.7 | 190.5 | 188.3 | 188.7 |
| Ethylene conversion at CSTR outlet | % | 89.9 | 86.0 | 89.8 | 90.0 |
| CSTR Agitator Speed | rpm | 260.0 | 260.0 | 260.0 | 260.0 |
| Polymer Production rates |  |  |  |  |  |
| CSTR Polymer production rate (based on heat/mass balance) | kg/hr | 85.0 | 83.2 | 83.1 | 84.0 |
| Tubular reactor polymer production rate (based on heat/mass balance) | kg/hr | 3.9 | 14.3 | 23.1 | 22.7 |
| Total Polymer Production Rate (based on heat/mass balance) | kg/hr | 88.9 | 97.6 | 106.6 | 106.7 |
| Tubular Reactor conditions |  |  |  |  |  |
| Tubular reactor volume | % CSTR | 10.0 | 82.0 | 82.0 | 82.0 |
| Tubular reactor feed temperature | C. | 189.0 | approx 30 | 41.0 | 126.0 |
| Ethylene to tubular reactor | kg/hr | 0.0 | 0.0 | 15.0 | 15.0 |

TABLE 1-continued

|  | Units | Comparative 1 Values | Comparative 2 Values | Comparative 3 Values | Inventive Values |
|---|---|---|---|---|---|
| Solvent flow to tubular reactor | kg/hr | 6.0 | 6.0 | 15.0 | 15.0 |
| Total flow to tubular reactor | kg/hr | 6.0 | 6.0 | 32.9 | 33.0 |
| Total flow to CSTR and tubular reactor | kg/hr | 656.1 | 656.0 | 681.9 | 682.9 |
| Tubular reactor temperature difference (outlet − inlet) | C. | 3.2 | 14.5 | 29.4 | 28.3 |
| Tubular reactor Inlet Temperature | C. | 190.7 | 190.5 | 188.3 | 188.7 |
| Tubular reactor Outlet Temperature | C. | 193.9 | 205.0 | 217.7 | 217.0 |
| Tubular reactor inlet pressure | MPa | 16.3 | 16.4 | 18.2 | 16.3 |
| Tubular reactor outlet pressure | MPa | 16.2 | 16.3 | 16.2 | 16.2 |
| Tubular reactor pressure difference | MPa | 0.1 | 0.1 | 1.9 | 0.1 |
| Catalyst Ratios and conditions |  |  |  |  |  |
| Catalyst concentration in CSTR | ppm TiCl4 | 5.04 | 2.76 | 4.79 | 4.51 |
| Cl/Mg ratio | mol/mol | 1.81 | 1.82 | 1.80 | 1.81 |
| Et2AlOEt/Ti ratio | mol/mol | 1.35 | 1.36 | 1.35 | 1.35 |
| Et3Al/Ti ratio | mol/mol | 0.35 | 0.35 | 0.35 | 0.35 |
| Polymer Analysis |  |  |  |  |  |
| Density | g/cc | 0.9194 | 0.9208 | 0.9195 | 0.9192 |
| MI | g/10 min | 0.98 | 0.97 | 0.85 | 1.00 |
| S. Ex |  | 1.29 | 1.31 | 1.29 | 1.30 |
| MFR |  | 27.8 | 29.0 | 27.2 | 28.5 |
| Polymer Hexane extractable level | wt % | 0.66 | 0.76 | — | 0.65 |
| Polymer gel level | gel/m2 | — | — | 399 | 58 |

Example 2

A homopolymerization was conducted using the above described Ziegler/Natta catalyst. A tubular reactor having a volume of 82% of the CSTR was employed and a temperature rise of 24.8° C. was observed across the length of the tubular reactor. The ethylene feed into the tubular reactor was tempered to 126° C. The homopolymer had a density of 0.965 g/cc, an MI (or $I_2$) of 9.3 g/10 minutes and a hexane extractable level of 0.18%

Example 3

This example illustrates the use of a three reactor configuration (two CSTRs and a tubular reactor) and the use of a single site catalyst.

The single site catalyst system includes a titanium catalyst component namely (cyclopentadienyl) (tri-tertiary butyl phosphinimine) titanium dichloride; methylalumoxane (or MAO); a hindered phenol (2,4 ditertiary butyl, 6 ethyl phenol) and tetrakis (pentafluorophenol) boron.

The first CSTR flows into the second CSTR which flows into the tubular reactor (i.e. the three reactors are connected in series).

The first CSTR has a volume that is 54% of the volume of the second CSTR. The second CSTR used in this example was the same CSTR used in Examples 1 and 2. The tubular reactor had a volume of 82% of the volume of the second CSTR.

Using the polymerization conditions shown in Table 2, an ethylene-octene copolymer having an MI of 1.2 and a density of 0.9171 g/cc was produced. Film was prepared from this polymer and found to have a very low gel level of 9.7 gels/square meter.

TABLE 2

|  | Units | Inventive |
|---|---|---|
| First CSTR conditions |  |  |
| Total flow to CSTR | kg/hr | 394.9 |
| Ethylene feed conc. to CSTR | wt % | 9.8 |
| 1-octene/ethylene ratio in CSTR feed | wt/wt | 1.4 |
| hydrogen conc in CSTR feed | ppm | 1 |
| Primary Feed Temp to CSTR | C. | 30 |
| CSTR Mean Temp | C. | 141.3 |
| Ethylene conversion at CSTR outlet | % | 78.6 |
| CSTR Agitator Speed | rpm | 690 |
| Second CSTR conditions |  |  |
| Total flow to CSTR | kg/hr | 600 |
| Ethylene feed conc. to CSTR | wt % | 12.9 |
| 1-octene/ethylene ratio in CSTR feed | wt/wt | 0 |
| hydrogen conc in CSTR feed | ppm | 0.6 |
| Primary Feed Temp to CSTR | C. | 30 |
| CSTR Mean Temp | C. | 189.4 |
| Ethylene conversion at CSTR outlet | % | 83.8 |
| CSTR Agitator Speed | rpm | 260 |
| Calculated Polymer Production rates |  |  |
| First CSTR Polymer production rate (based on heat/mass balance) | kg/hr | 34.3 |

TABLE 2-continued

| | Units | Inventive |
|---|---|---|
| First CSTR Polymer production rate (based on heat/mass balance) | kg/hr | 44 |
| Tubular reactor polymer production rate (based on heat/mass balance) | kg/hr | 10.9 |
| Total Polymer Production Rate (based on heat/mass balance) | kg/hr | 89.2 |
| Tubular Reactor conditions | | |
| Tubular reactor volume | % second CSTR | 82 |
| Tubular reactor feed temperature | C. | 151 |
| Ethylene to tubular reactor | kg/hr | 5 |
| Solvent flow to tubular reactor | kg/hr | 10 |
| Total flow to tubular reactor | kg/hr | 15 |
| Total flow to CSTR's and tubular reactor | kg/hr | 615 |
| Tubular reactor temperature difference (outlet − inlet) | C. | 10.6 |
| Tubular reactor Inlet Temperature | C. | 192.3 |
| Tubular reactor Outlet Temperature | C. | 202.9 |
| Tubular reactor inlet pressure | MPa | 16.4 |
| Tubular reactor outlet pressure | MPa | 16.3 |
| Tubular reactor pressure difference | MPa | 0.1 |
| Catalyst Ratios and conditions | | |
| catalyst to first CSTR | ppm | 0.07 |
| MAO/Ti first CSTR | mol/mol | 100 |
| Phenol/Al first CSTR | mol/mol | 0.3 |
| Boron/Ti first CSTR | mol/mol | 1.1 |
| catalyst to second CSTR | ppm | 0.2 |
| MAO/Ti second CSTR | mol/mol | 25 |
| Phenol/Al second CSTR | mol/mol | 0.3 |
| Boron/Ti second CSTR | mol/mol | 1.2 |
| Polymer Analysis | | |
| Density | g/cc | 0.9171 |
| MI | g/10 min | 1.2 |
| S. Ex | | 1.27 |
| MFR | | 29.2 |
| Polymer Hexane extractable level | wt % | — |
| Polymer gel level | gel/m2 | 9.7 |

What is claimed is:

1. A process for the preparation of polyethylene having a density of from 0.890 to 0.970 g/cc comprising the polymerization of ethylene and, optionally, a comonomer in at least two polymerization reactors, wherein said process comprises:
   a) providing a first ethylene feed containing ethylene and, optionally, at least one $C_4$ to $C_{10}$ alpha-olefin comonomer to at least one continuously stirred tank reactor (CSTR) in the presence of a catalyst system under solution polymerization conditions, thereby producing a first polyethylene solution containing a first polyethylene component;
   b) discharging said first polyethylene solution to a tubular reactor at a first discharge temperature;
   c) directing additional, tempered, ethylene to said tubular reactor under polymerization conditions whereby additional polymerization occurs in the presence of said first polyethylene solution; and
   d) discharging from said tubular reactor a final polyethylene solution containing said first polyethylene solution and said additional polyethylene at a final discharge temperature,
with the proviso that said additional tempered ethylene is added at a temperature of between 100° C. and said final discharge temperature.

2. The process of claim 1 wherein said additional ethylene and additional solvent are added to said tubular reactor such that the weight ratio of said additional solvent to said additional ethylene is from 20/1 to 0.1/1.

3. The process of claim 2 wherein said additional ethylene and said additional solvent are tempered to a temperature of from 100° C. to 200° C. before being added to said tubular reactor.

4. The process of claim 1 wherein said additional ethylene is from 1 to 50 weight % of the ethylene added to said at least one CSTR.

5. The process of claim 2 wherein said tubular reactor has a volume which is from 30 to 200% of the volume of said CSTR.

6. The process of claim 3 wherein:
   a) at least 60 weight % of the ethylene contained in said first ethylene feed is converted to polyethylene in said at least one CSTR; and
   b) said final discharge temperature is at least 3° C. higher than said CSTR discharge temperature.

7. The process of claim 6 wherein hydrogen is added to said CSTR.

8. The process of claim 7 wherein said catalyst system contains a catalyst component which comprises a group IV transition metal.

9. The process of claim 4 wherein at least 70 weight % of the ethylene contained in said first ethylene feed is converted to polyethylene in said at least one CSTR.

10. A process for the preparation of polyethylene having a density of from 0.900 to 0.930 g/cc comprising the polymerization of ethylene in at least two polymerization reactors, wherein said process comprises:
   a) providing a first ethylene feed containing ethylene and at least one alpha-olefin comonomer to at least one continuously stirred tank reactor (CSTR) in the presence of a catalyst system under solution polymerization conditions, thereby producing a first solution containing a first polyethylene component and residual comonomer;
   b) discharging said solution containing said first polyethylene component to a tubular reactor at a first discharge temperature;
   c) directing additional, tempered, ethylene to said tubular reactor under polymerization conditions whereby additional polymerization occurs in the presence of said first polyethylene component; and
   d) discharging from said tubular reactor a final polyethylene solution containing said first polyethylene component and said additional polyethylene at a final discharge temperature,
with the proviso that said tempered ethylene is added at a temperature of between 100° C. and said final discharge temperature.

11. A process for the preparation of polyethylene having a density of from 0.900 to 0.930 g/cc comprising the polymerization of ethylene in at least two polymerization reactors, wherein said process comprises:
   a) providing a first ethylene feed containing ethylene and at least one alpha-olefin comonomer to at least one continuously stirred tank reactor (CSTR) in the presence of a catalyst system under solution polymerization conditions, thereby producing a first solution containing a first polyethylene component and residual comonomer;
   b) discharging said solution containing said first polyethylene component to a tubular reactor at a first discharge temperature;
   c) directing additional, tempered, ethylene to said tubular reactor under polymerization conditions whereby additional polymerization occurs in the presence of said first polyethylene component; and d) discharging from said tubular reactor a final polyethylene solution containing said first polyethylene component and said additional polyethylene at a final discharge temperature, with the provisos that a) said additional tempered ethylene is added at a temperature of between 100° C. and said final discharge temperature and b) no catalyst is added to said tubular reactor.

* * * * *